Dec. 15, 1970  R. STEDING  3,548,041
LENS MOLD MAKING BY PLATING LENTICULATIONS
ON A MASKED CONDUCTIVE SUPPORT
Filed July 3, 1967  2 Sheets-Sheet 1
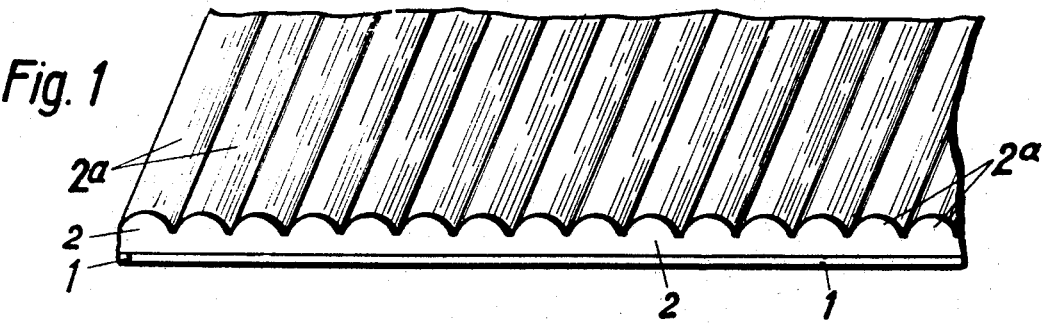
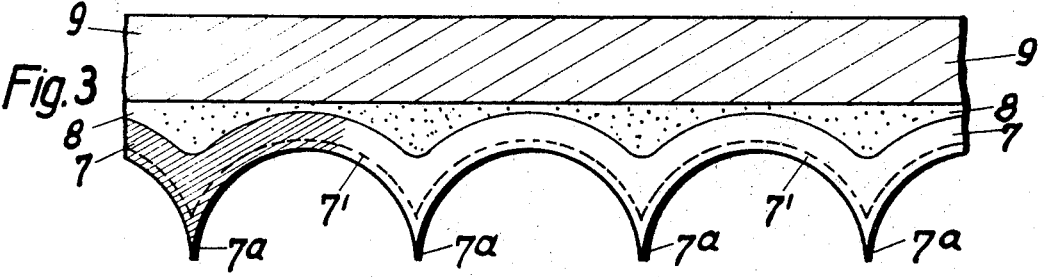
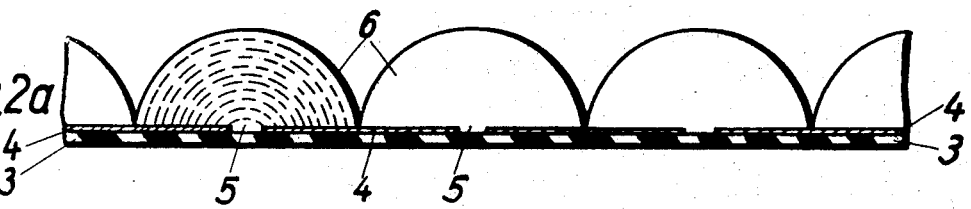
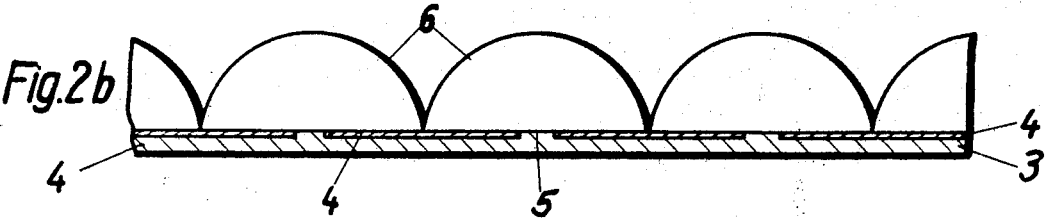
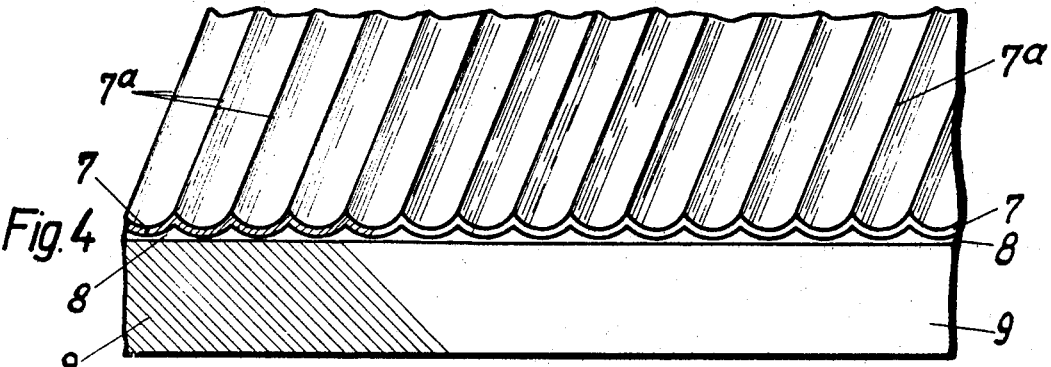
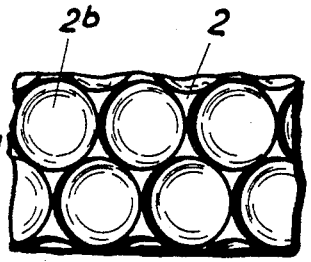
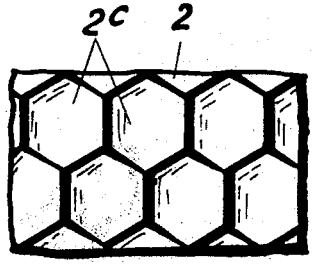

United States Patent Office 3,548,041
Patented Dec. 15, 1970

3,548,041
LENS MOLD MAKING BY PLATING LENTIC-ULATIONS ON A MASKED CONDUCTIVE SUPPORT
Richard Steding, 87 Werdohler Str., Ludenscheid, Germany
Filed July 3, 1967, Ser. No. 650,687
Claims priority, application Germany, July 7, 1966, St 25,613
Int. Cl. B29d 11/00; C23b 7/00, 7/06
U.S. Cl. 264—1    10 Claims

ABSTRACT OF THE DISCLOSURE

A process for manufacturing sheets of a transparent synthetic resin including a large number of lenticular elements, such sheets being widely used for achieving three dimensional effects in pictorial representation. The process involves formation of synthetic-resin-forming tools by plating steps, and application of such tools including formation of a master or prototype pattern, for the formation of transparent sheets having a large number of lenticular elements.

BACKGROUND OF INVENTION

It is possible to achieve three-dimensional effects in pictorial representations by laminating a sheet of transparent synthetic resin being planar on one side and including a large number of lenticular elements on the other side to a particular kind of pictorial representation printed on a paper, or like support. Generally the pictorial representation is in form of strips and the side of the transparent sheet laminated to the pictorial representation remote from the pictorial representation forms a system of parallel cylindrical lenses having the same width as the aforementioned strips into which the pictorial representation of a subject, or motive, is subdivided. The width of the aforementioned cylindrical lenses is in the order of 100 microns, and their radius of curvature is correspondingly small. This makes it extremely difficult to manufacture transparent plastic sheets having a lenticular pattern adapted for the purpose of imparting to pictorial representation a three-dimensional character.

It is possible to form lenticular plastic sheets by means of an appropriately engraved steel plate, or by a steel plate into which an appropriate lenticular pattern has been ground, these two processes representing the state of the art. These processes involve great difficulties and are very expensive and their results are never entirely satisfactory. This is due to the fact that it is impossible to obtain perfectly smooth micro-lenticular patterns on steel plates when establishing these patterns by micro-engraving or micro-grinding. The process according to this invention is not subject to the serious limitations and drawbacks of these state of the art processes. It is also known to make micro-lenticular patterns by machining wax surfaces from which forming tools for plastic sheets are derived by plating steps. Machining of wax surfaces is a task which is difficult to achieve. Hence it is highly desirable to substitute for this process step another step yielding like results but not subject to its limitation.

SUMMARY OF INVENTION

According to this invention a support is provided with a pattern of electroconductive surface elements and intermediate nonelectroconductive surface elements. This support is then used for forming a plating matrix. This is done by galvanically plating the support until corrugations are formed on the surface thereof. The process of galvanic plating is continued until said corrugations extend by lateral growth entirely over said nonelectroconductive surface elements and merge to form a continuous sheet having sharp edges between contiguous corrugations. Thereafter a coat of an electroconductive release agent, or release medium, is provided on the surface of the aforementioned plating matrix remote from said support. As a result of providing the above coat of an electroconductive release agent, or release medium, any deposit plated on the surface so treated can readily be removed therefrom. Upon having so treated the plating matrix, an additional layer of metal is plated over the surface of the matrix remote from said support, and thus an additional separable sheet metal layer is formed having concave surface elements on one side thereof and convex surface elements on the other side thereof. This additional metal layer is then removed from the plating matrix and used for forming a sheet of transparent synthetic resin on the surface thereof which has concave surface elements. The resulting sheet of transparent synthetic resin has a surface which is planar, and another surface which is covered with a system of small convex lenses, e.g., a system of cylindrical lenses having a width in the order of 100 microns.

BRIEF DESCRIPTION OF THE DRAWINGS

FIG. 1 is an isometric view of a pictorial representation of some object on a paper or like support to which a sheet of a transparent plastic or synthetic resin is laminated, this sheet having a planar surface in abutting relation with the support of the pictorial representation and cemented to the latter;

FIG. 2a shows a plating matrix partly in cross-section and partly in side elevation;

FIG. 2b shows a modification of the plating matrix of FIG. 2a, partly in cross-section and partly in side elevation;

FIG. 3 shows a tool for forming transparent plastic sheets having lenticular patterns thereon, this tool being derived from the plating matrix shown in FIG. 2a or FIG. 2b;

FIG. 4 is an isometric view of the tool shown in FIG. 3;

FIG. 5a is a top plan view of a modification of the structure of FIG. 1 involving spherical lenticular elements rather than cylindrical lenticular elements;

FIG. 5b is a top plan view of a structure similar to that of FIG. 5a but including lenticular elements which have a hexagonal outline;

DESCRIPTION OF PREFERRED EMBODIMENTS OF THE INVENTION

Figure 6:
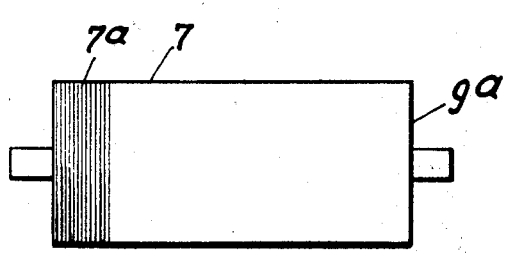
FIG. 6 is a front elevation of a drum-shaped engraving tool generally of the same kind as the tool shown in FIG. 3.

Referring to FIG. 1, numeral 1 has been applied to indicate a support for a pictorial representation which is printed on its front surface. The support may be of a paper, or an equivalent thereof. The pictorial representation is in the form of a system of narrow strips, each about 100 microns in width. Reference character 2 has been applied to indicate a sheet of a transparent plastic. The side of the sheet immediately adjacent the beholder is lenticular, i.e., formed by a system of cylindrical microlenses 2a of which each is coextensive with one of the underlying strips into which the pictorial representation is subdivided to achieve a three-dimensional effect.

The invention itself is concerned with the plastic sheet 2, i.e., its manufacture, and the manufacture of the tool for its manufacture.

FIGS. 2a, 2b and 3 illustrate some of the steps involved in a galvanic plating process for making a tool for making the plastic layer 2 of FIG. 1.

In FIGS. 2a reference character 3 has been applied to indicate a plate of insulating material. Plate 3 is a metal-clad insulating plate, i.e., a metal-clad plate of the type widely applied in making printed electric circuits. Its metallic surface is highly polished and is provided with a pattern of parallel insulating strips 4 and intermediate strips 5 which are electroconductive. Such a pattern may be established in various ways as, for instance, by printing, or by wellknown photographic means. These photographic means include coating the plate with a light-sensitive medium or photoresist that hardens under the action of light, exposing strip-shaped areas of the plate to the action of light to harden these areas, removing the areas of the plate which have not been hardened by the action of light, and etching away the bare metal. When such a plate is treated in an electrolyte bath, or galvanized, a metal deposit forms at the conductive strips 5. As the process of galvanic electro-deposition is continued, the deposit flares out, or grows laterally, and then covers more and more the non-electroconductive strips 4. The dotted lines to the left of FIG. 2a illustrate successive phases of the growth of the electrolytic deposit resulting from continued deposition of nickel, or of a comparable hard plating metal. It is apparent from FIG. 2a that the deposit flares out progressively, or progresses to grow laterally, thus covering more and more of each of the nonelectroconductive strips 4. The process of electrodeposition is interrupted when the spacing between contiguous electrodeposits 6 is zero. In other words, the galvanic process of electrodeposition is interrupted after the separate deposits 6—shaped like mounds—merge on account of the growth thereof, and after the nonelectroconductive strips 4 are entirely covered by the merging deposits 6. The latter then define sharp edges at the locii of their merger, as clearly shown in FIGS. 2a and 2b. The width of mounds 6 is in the order of 100 microns. The angle enclosed between the surfaces of electrodeposits 6 is an acute angle at the time the process of galvanic electrodeposition is interrupted. The insulating plate 3 and the galvanic electrodeposits 6 formed thereon are then used as a plating matrix for receiving another sheet-like deposit, namely a deposit to be used as a tool for forming the plastic lenticular layer 2 of FIG. 1.

At the time the process of building up the structure or matrix of FIGS. 2a and 2b is interrupted, the surface thereof remote from plate 3 is extremely smooth, and has a high gloss, and this is of vital importance in order to impart similar surface properties to the tool for forming layer 2 of the structure of FIG. 1.

The next process step consists in providing the surface of matrix 3, 4, 6 remote from its flat insulating support 3 with a layer which permits removal of any deposit which may be formed thereon by plating. Such a layer must be formed by a chemical release agent which is electroconductive, e.g., by ammoniumbichromate. As an alternative, the surface of matrix 3, 4, 6 remote from its flat support 3 may be chrome plated, such plating operating as a release agent.

Thereafter an additional sheet metal layer is formed by plating the surface of matrix 3, 4, 6 remote from support 3. Reference character 7 has been applied in FIG. 3 to indicate the deposit formed on matrix 3, 4, 6 by plating its surface remote from plate 3. As shown in FIG. 3 part 7 may be bonded upon its removal from matrix 3, 4, 6 to substratum 9 by means of a cementitious layer 8. The thickness of layer 7 when separated from matrix 3, 4, 6 to be bonded to substratum 9 does not need to exceed a thickness of 200 microns. Instead of affixing metal layer 7 to a flat substratum as shown in FIG. 3 it may affixed to a roller 9a as shown in FIG. 6. Roller 6 may be made of a plastic material, if sufficiently strong. It will be apparent from FIG. 3 that the edges 7a between contiguous concave recesses of layer 7 are sharp and in the form of straight lines, as clearly shown in FIG. 4. The surface elements of the aforementioned recesses enclose acute angles at edges 7a. The thickness of substratum 9, or layer 7 supporting element 9, is considerably larger than the thickness of layer 7.

FIG. 2b illustrates a modification of the matrix-forming process of FIG. 2a. A highly polished metal plate 3 is covered with a light-sensitive material, or photoresist (not shown). Upon exposure thereof to a pattern of spaced strips, the photoresist is removed at the points where not exposed to the action of light, thus exposing the metal plate 3 at these points to the action of an etching medium, or acid. The cavities resulting from the ensuing etching step are filled with an electric insulating material to which reference character 4 has been applied. The plate 3 is then ground, to remove the remaining photoresist, thus exposing the electroconductive strips 5 situated between nonelectroconductive strips 4. Thereupon the process of galvanic deposition of metal is started and continued until projections or mounds 6 merge into a unitary surface layer to be used as plating matrix for forming the metal sheet 7 of FIG. 3. FIGS. 2a and 2b clearly show that the pattern of electroconductive and nonelectroconductive surface elements includes extremely narrow electroconductive surface elements 5 having equal spacings and intermediate relatively wide nonelectroconductive surface elements 4. The plating process illustrated in FIGS. 2a and 2b is continued until a corrugated sheet 6 is formed on the surface of support 3 having a thickness substantially equal to half said equal spacings between electroconductive elements 5, and the aforementioned plating process is interrupted at a point of time when contiguous corrugations of said corrugated sheet 6 begin to merge. Maintaining the above geometry of electroconductive surface elements 5 and timing the plating process in the above manner results in a very close approximation of the cross-sections of the corrugations of sheet 6 to semicircles.

In forming sheet 7 it may be desirable to resort to the process known as electroless plating, since electroless plating lends itself to achieving very hard metal surfaces. On the other hand, this plating process is rather time consuming and, therefore, expensive. Hence it is desirable to resort to composite layers 7 of sheet metal including a first layer formed by electroless plating and a second layer formed by galvanic plating. Such composite layers 7 are particularly desirable on account of the fact that the initial layer formed by electroless plating may safely be backed-up by a layer of a relatively inexpensive material, e.g., copper, or soft nickel.

FIG. 3 illustrates a composite layer 7 which includes two superimposed sheet metal layers whose boundary surfaces have been indicated by reference character 7'.

If it is intended to adopt the composite or two layer structure of FIG. 3, the same may be removed from the plating matrix 3, 4, 6 and the layer initially formed by electroless plating hardened by conventional heat treatment. Thus a hardness in the order of 1250 Vickers may be achieved.

FIG. 4 illustrates a sheet metal layer 7 having parallel concave recesses bounded by sharp edges 7a comparable to a knife's cutting edge. Edges 7a are straight and have no irregularities or recesses therein.

The structure of FIG. 5a may be made with a tool of the kind shown in FIGS. 3, 4 and 6 wherein the recesses are spherical rather than cylindrical. Reference character 2b indicates one of the spherical projections of transparent sheet 2.

The structure of FIG. 5b may be made with a tool of the kind shown in FIGS. 3, 4 and 6 wherein the lenticular recesses are bounded by a hexagonal outline.

Reference character 2c indicates one of the spherical projections of transparent sheet 2.

Figure 7:
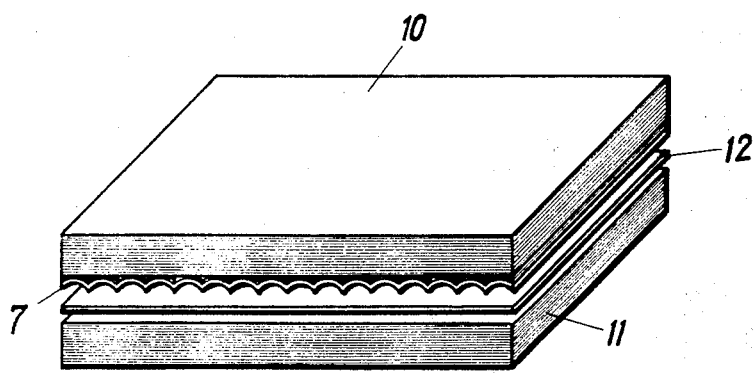
FIGS. 7, 8 and 9 are isometric representations of three different arrangements for making transparent lenticular sheets by means of the structures of FIGS. 3 and 4.

The last step in making sheets 2 of the kind shown in FIGS. 2, 5a and 5b consists in applying the sheet metal layer 7 of FIGS. 3 and 7 for forming a transparent synthetic resin material. This is illustrated in FIGS. 7 to 9, inclusive.

Figure 8:
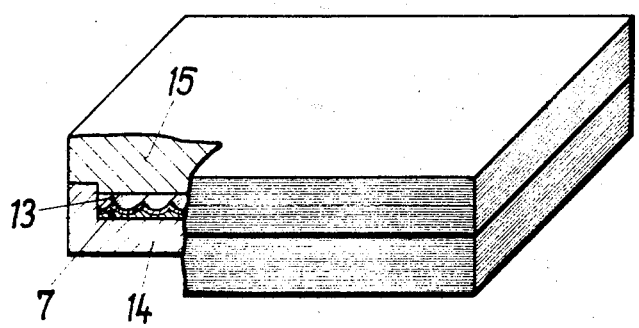
Figure 9:
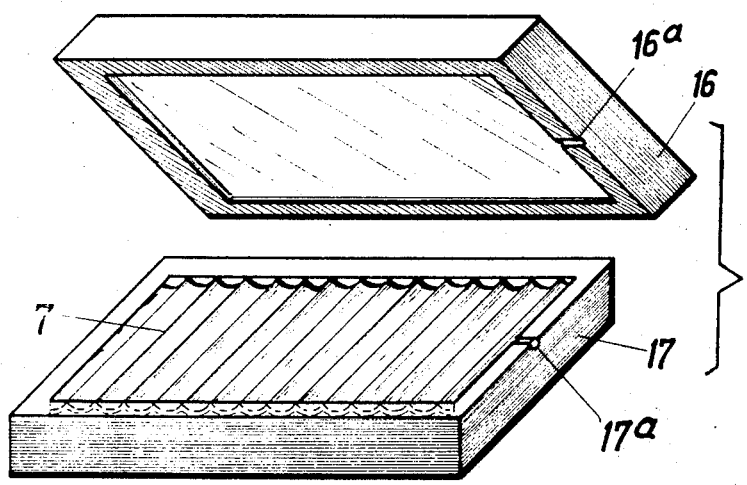

FIGS. 7, 8 and 9 illustrate three different ways in performing the last step in the process of manufacturing a transparent sheet of synthetic resin including a large number of lenticular elements, i.e., of forming said sheet of resin on the surface of the aforementioned additional layer 7 of metal having concave surface elements.

Referring now to FIG. 7, this figure shows a plate 10 on the lower surface of which the aforementioned additional layer 7 of metal having concave surface elements has been secured. Plate 10 is provided with internal heating means (not shown) and under the action of a press (not shown) capable of exerting a downward pressure upon plate 10. Reference numeral 11 has been applied to indicate a plate arranged below plate 10, and in registry with plate 10. A sheet 12 of thermoplastic material is arranged between plates 10 and 11. When plate 10 is lowered against plate 11, the sheet 12 of thermoplastic material arranged between plates 10 and 11 and which is initially bounded by two parallel planar surfaces is softened under the action of heat and pressure, thus imparting to one side of it the lenticular geometry shown in FIG. 2, wherein reference character 2 has been applied to indicate the thermoplastic sheet 12 upon its formation in the structure of FIG. 7.

FIG. 8 shows a modification of the process of FIG. 7 wherein a layer 13 of synthetic resin in pulverulent or granular form is spread upon the additional layer 7 having concave surface elements. Layer 7 is arranged at the bottom of a recess defined by the female portion 14 of a mold including a male portion 15. The male portion 15 is movable inside the female portion. Either or both of the portions 14, 15 of the dual mold of FIG. 8 is adapted to be heated by appropriate heating means (not shown). The male portion 15 is adapted to be lowered under considerable pressure into the female portion 14 of the mold. The synthetic resin in pulverulent or granular form is caused to fuse under the action of heat and pressure, thus forming a lenticular sheet of the kind described in connection with FIG. 2, to which reference character 2 has been applied in FIG. 2.

Referring now to FIG. 9, this figure illustrates a die including a top portion 16 and a bottom portion 17. The bottom portion 17 has an insert 7 substantially identical with the sheet metal layer 7 of FIG. 3 and FIG. 4. Top portion 16 defines a semicylindrical passageway 16a and bottom portion 17 defines a semicylindrical passageway 17a. Passageways 16a, 17a are complementary and jointly define a cylindrical passageway when top-portion 16 is superimposed in registry upon bottom portion 17. Liquid synthetic resins may be injected into the die by the composite passageway 16a, 17a and form therein a transparent lenticular sheet of the kind shown in FIG. 2, and designated therein by the reference numeral 2. The process of formation of the transparent lenticular sheet in the die 16, 17 is, in essence, a die casting process, the liquid resin in die 16, 17 being converted into a solid sheet by any kind of appropriate resin curing method, either thermal or chemical.

One particularly important aspect of the process which has been described above resides in the fact that the concave surfaces of metal layer 7 are of molecular smoothness, appropriate to form a sheet of synthetic resin required to have rigid optical performance characteristics. Such smoothness could not be achieved with any mechanical tool such as an engraving tool, or a grinding and polishing tool.

The method and the structures disclosed herein may be varied, or modified, without departing from the true spirit of the invention, or the scope thereof. The above disclosure has been made to illustrate but not to limit the invention, the scope of which is defined by the appended claims.

I claim as my invention:

1. A process for manufacturing sheets of a transparent synthetic resin including a large number of lenticular elements arranged in a predetermined pattern, said process including the steps of:
    (a) providing a support with a pattern of electroconductive surface elements and intermediate nonelectroconductive surface elements;
    (b) forming a plating matrix on said support by galvanically plating said support until corrugations are formed on the surface thereof by lateral growth of plating metal extending over said intermediate nonelectroconductive surface elements, and continuing to galvanically plate said support until said corrugations extend by lateral growth entirely over said nonelectroconductive surface elements and merge to form a continuous sheet having sharp edges between contiguous corrugations;
    (c) providing a coat of an electroconductive release medium on the surface of said plating matrix remote from said support;
    (d) plating an additional layer of metal over said surface of said plating matrix remote from said support and thus forming a separable sheet metal layer having concave surface elements on one said thereof and convex surface elements on the other side thereof;
    (e) separating said additional sheet metal layer from said plating matrix; and
    (f) forming a sheet of transparent synthetic resin on the surface of said additional layer of metal having concave surface elements.

2. A process as specified in claim 1 wherein alternating parallel straight electroconductive and nonelectroconductive surface elements are formed on said support resulting ultimately in the formation of a system of straight, substantially cylindrical lens elements on said sheet of synthetic resin.

3. A process as specified in claim 1 wherein the steps of forming a plating matrix on said support consists of nickel plating said support.

4. A process as specified in claim 1 wherein the step of plating an additional layer of metal over said surface of said plating matrix remote from said support is performed in two consecutive operations including electroless plating of a first metal stratum on the surface of said plating matrix remote from said support and thereafter galvanically plating a second metal stratum on the surface of said first metal stratum remote from said support.

5. A process as specified in claim 1 wherein the step of plating an additional layer of metal over said surface of said plating matrix remote from said support is performed in two consecutive operations including electroless plating of a first metal stratum on the surface of said plating matrix remote from said support and thereafter galvanically plating a second metal stratum on the surface of said first metal stratum remote from said support, and wherein said first stratum of the composite formed by said first stratum and said second stratum is thermally hardened following separation thereof from said plating matrix.

6. A process as specified in claim 1 wherein the step of forming a sheet of transparent synthetic resin on said surface of said additional layer of metal having concave surface elements is effected by causing engagement under heat and pressure of a sheet of synthetic resin having planar surfaces with said surface of said additional layer having concave surface elements.

7. A process as specified in claim 1 wherein the step of forming a sheet of transparent synthetic resin on said surface of said additional layer of metal is effected by spreading a layer of a pulverulent synthetic resin over said surface of said additional layer having concave surface elements and thereafter converting said layer of a pulverulent synthetic resin by the application of heat and pressure into an integral lenticular sheet.

8. A process as specified in claim 1 wherein the step of forming a sheet of transparent synthetic resin on said surface of said additional layer of metal having concave surface elements is effected by spreading a layer of synthetic resin in liquid form over said surface of said additional layer having concave surface elements and thereafter causing curing of said layer and conversion thereof into a lenticular solid sheet.

9. A process for manufacturing tools for manufacturing lenticular sheets of synthetic resins including the steps of:
    (a) providing a support with a pattern of parallel electroconductive strips alternating with nonelectroconductive strips having a spacing between the centers thereof in the order of 100 microns;
    (b) forming a plating matrix on said support by galvanically plating said support until corrugations are formed on the surface thereof, and continuing to galvanically plate said support until said corrugations extend entirely over said nonelectroconductive strips and merge into a continuous sheet having sharp edges between contiguous corrugations;
    (c) providing a coat of an electroconductive release medium on the surface of said plating matrix remote from said support;
    (d) plating an additional layer of metal over said surface of said plating matrix remote from said support and continuing to plate said additional layer until the thickness thereof is in the order of 200 microns and thus forming a separable sheet metal layer having concave surface elements on one side thereof and convex surface elements on the other side thereof;
    (e) separating said additional sheet metal layer from said plating matrix; and
    (f) mounting said additional sheet metal layer on a layer-supporting element having a thickness considerably larger than the thickness of said additional sheet metal layer.

10. A process for manufacturing tools for manufacturing lenticular sheets of synthetic resins including the steps of:
    (a) providing a support with a pattern consisting of extremely narrow electroconductive surface elements having equal spacings in the order of 100 microns and intermediate relatively wide nonelectroconductive surface elements;
    (b) plating said support until a corrugated sheet is formed on the surface thereof having a thickness substantially equal to half of said equal spacings between said electroconductive surface elements and interrupting the process of plating at a point of time when contiguous corrugations of said corrugated sheet begin to merge;
    (c) providing a coat of electroconductive release medium on the surface of said corrugated sheet remote from said support;
    (d) plating an additional layer of metal over the surface of said corrugated sheet remote from said support and thus forming a separable plated layer having concave surface elements on one side thereof and convex surface elements on the other side thereof; and
    (e) separating said additional plated layer from said corrugated sheet.

References Cited

UNITED STATES PATENTS

| | | | |
|---|---|---|---|
| 2,166,366 | 7/1939 | Norris | 204—11 |
| 2,650,191 | 8/1953 | Teal | 204—15 |
| 2,650,900 | 9/1953 | Holman | 264—220 |
| 3,324,015 | 6/1967 | Saia et al. | 204—15 |
| 2,226,383 | 12/1940 | Norris | 204—11 |

FOREIGN PATENTS 475,626  11/1937  Great Britain _____ 264—1

DONALD J. ARNOLD, Primary Examiner

A. H. KOECKERT, Assistant Examiner

U.S. Cl. X.R.

204—4, 7; 264—219, 225